UNITED STATES PATENT OFFICE.

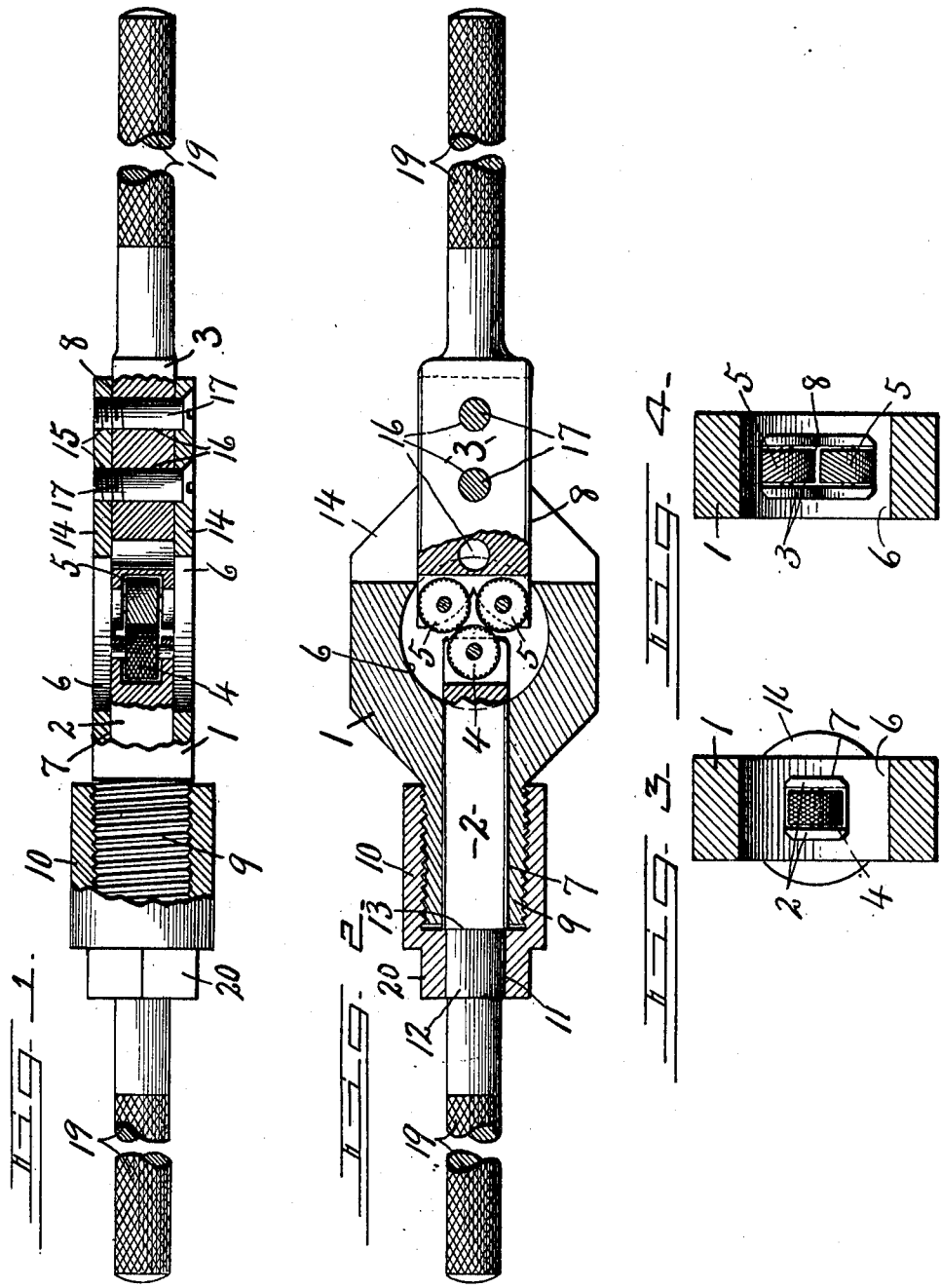

ARTHUR B. CAMPBELL, OF SYRACUSE, NEW YORK.

NURLING DEVICE.

980,197.

Specification of Letters Patent.

Patented Jan. 3, 1911.

Application filed July 12, 1910. Serial No. 571,561.

*To all whom it may concern:*

Be it known that I, ARTHUR B. CAMPBELL, of Syracuse, in the county of Onondaga, in the State of New York, have invented new and useful Improvements in Nurling Devices, of which the following, taken in connection with the accompanying drawings, is a full, clear, and exact description.

This invention relates to certain improvements in nurling tools involving the use of opposed nurling rollers mounted upon coaxial bars or shanks which are relatively adjustable axially upon a suitable supporting head.

The main object is to locate the nurling rollers so as to oppose the pressure of any one of them upon the object to be knurled, so that the rollers may be applied with considerable pressure to such objects without liability of springing the same, thereby producing a deeper nurling effect within a shorter space of time than would be possible with the usual nurling tool applied to one side only of the object.

Another object is to provide for the adjustment of the roller supporting members for work of different sizes, and at the same time to enable the pressure of the rollers upon the work to be increased or diminished during the nurling operation.

Other objects and uses will be brought out in the following description.

In the drawings: Figures 1 and 2 are longitudinal sectional views partly in elevation and at right angles to each other of a nurling tool embodying the various features of my invention. Figs. 3 and 4 are transverse sectional views through the same device between the opposed nurling rollers looking in opposite directions.

This nurling device is adapted to be used upon work held either in a lathe or a vise, that is, it may be held, and the work rotated between the nurling rollers or may be rotated around and upon a fixed object, and consists of a main supporting frame or head —1—, oppositely disposed coaxial tool holders or shanks —2— and —3— carrying suitable nurling rollers —4— and —5—, and means for adjusting the tool holders or shanks axially to vary the space between the meeting faces of the nurling rollers for the reception of objects of different sizes.

The head —1— is provided with a central circular opening —6— of ample size to easily receive the object to be knurled, and is also provided with coaxial openings —7— and —8—, preferably angular or rectangular, in cross-section for the reception of the respective shanks or tool holders —2— and —3— which are also rectangular and fitted with an easy sliding fit in their respective openings.

One end of the head —1—, having the opening —7—, is provided with a reduced circular externally threaded extension —9— engaged by an internally threaded sleeve or collar —10—, having its outer end provided with a centrally circular opening —11— adapted to fit upon a reduced circular portion —12— of the shank —2—, thereby forming a shoulder —13— adapted to be engaged by the nut or collar —10— for the purpose of forcing the shank —2— inwardly and permitting said shank to be moved outwardly as the collar —10— is screwed upon or from the reduced portion —9—. The opposite end of the head —1— is bifurcated forming opposite arms —14— spaced apart a distance corresponding to the transverse thickness of the shank —3— which is fitted between said arms, the arms and shank —3— being provided with bolt openings —15— and —16— for the reception of clamping bolts —17—, by which the shank is adjustably secured to the head against endwise movement. In the present instance I have shown the shank —3— as provided with a greater number of bolt openings than in the head —1— to permit the shank to be adjusted to different positions and reclamped in place, usually by two of the bolts —17—.

The outer ends of the shanks —2— and —3— are extended some distance beyond opposite ends of the head —1— to form handles —19— which are preferably knurled and by which the entire nurling tool may be rotated about the object operated upon or held against rotation in engagement with a rotary object in a lathe. The entire ends of the shanks —2— and —3— are also bifurcated for receiving their respective rollers —4— and —5—, the roller —4— being located between and journaled in the arms of the shank —2— and its periphery is provided with intersecting spiral ribs or threads.

The shank —3— is provided with a pair of rollers —5— located at opposite sides of the axis between and journaled in the opposite arms of said shank parallel with the axis of the roller —4—, said rollers —5— being spirally ribbed in opposite directions so that the ribs of one roller will correspond to one set of spiral ribs on the roller —4— while the ribs of the other roller —5— will correspond to the other set of spiral ribs on roller —4—.

The object to be knurled, which is usually round, is inserted axially through the opening —6— in the head —1— and between the rollers —4— and —5—, the latter being previously adjusted, either by adjusting the head —3— or collar —10—, or both, so that the object will readily pass between the nurling rollers.

The ribs on the peripheries of the nurling rollers —4— and —5— are V shaped, or in the form of threads and are hardened so as to readily cut into the object operated upon without seriously dulling the cutting edges of the nurling ribs.

After the object to be knurled has been placed in proper position between the nurling rollers, the nut or sleeve —10— may be adjusted and screwed, either by hand or by means of a wrench, applied to an angular part —20— on said sleeve so as to bring the peripheries of the nurling rollers into cutting engagement with the object, the sleeve —10— being gradually tightened as the operaton proceeds so as to cut or nurl the object to the desired depth.

When setting the tool for objects of widely differing diameters, the change from one extreme to another may be quickly made by simply removing the screws —17— and sliding the shank —3— endwise until another set of bolt openings therein are registered with those in the arms —14— whereupon the clamping bolts may be reinserted to lock the shank to the head. When this is done the finer adjustments, as, for instance, in tightening the nurling rollers upon the work, is effected by means of the sleeeve —10—.

What I claim is:

1. A nurling tool comprising a head having a central opening and guide openings extending laterally from the central opening through opposite ends of the head, a bar adjustable endwise in one of the guide openings, a pair of nurling rollers journaled on the inner end of said bar, an additional bar movable endwise in the other opening, a single nurling roller mounted on the inner end of the additional bar, and means for adjusting one of said bars endwise.

2. A nurling tool comprising a head having a central opening and guide openings extending laterally in opposite directions from the central opening through opposite ends of the head, one end of said head having a reduced threaded portion, separate bars mounted in the guide openings, a pair of nurling rollers on the inner end of one of the bars, a single nurling roller on the adjacent end of the other bar, and a nut engaging the reduced threaded portion of the head and adjacent bar for moving said bar endwise.

3. A nurling tool comprising a head, separate bars mounted upon the head end to end, a pair of nurling rollers mounted on the inner end of one of the bars and having their peripheries provided with spiral ribs inclined in opposite directions, a nurling roller on the inner end of the other bar and having its periphery provided with intersecting spirally arranged ribs, and means for adjusting one of the bars endwise.

In witness whereof I have hereunto set my hand on this 2nd day of July, 1910.

ARTHUR B. CAMPBELL.

Witnesses:
   H. E. CHASE,
   PERSIS PHYLLIS PARKS.